United States Patent [19]

Hammond et al.

[11] Patent Number: 5,360,974
[45] Date of Patent: Nov. 1, 1994

[54] DUAL QUAD FLEXURE SCANNER

[75] Inventors: James M. Hammond; Martin A. Klos, both of Boca Raton, Fla.; Yves Martin, Ossining, N.Y.; Kenneth G. Roessler, Boca Raton; Robert M. Stowell, Delray Beach, both of Fla.

[73] Assignee: International Business Machines Corp., Armonk, N.Y.

[21] Appl. No.: 963,886

[22] Filed: Oct. 20, 1992

[51] Int. Cl.⁵ .............................................. G21K 5/10
[52] U.S. Cl. ................................ 250/442.11; 33/568; 248/179
[58] Field of Search ................... 250/442.11; 33/568; 248/179

[56] References Cited

U.S. PATENT DOCUMENTS

| | | |
|---|---|---|
| 4,520,570 | 6/1985 | Bednorz et al. ................... 33/180 |
| 4,559,717 | 12/1985 | Scire et al. ......................... 33/568 |
| 4,575,942 | 3/1986 | Moriyama .......................... 33/568 |
| 4,635,887 | 1/1987 | Hall et al. ......................... 248/179 |
| 4,667,415 | 5/1987 | Barsky ............................... 33/568 |
| 4,688,908 | 8/1987 | Moore ............................... 350/531 |
| 4,841,191 | 6/1989 | Takata et al. ..................... 310/317 |
| 4,908,519 | 3/1990 | Park et al. ..................... 250/442.11 |
| 4,920,660 | 5/1990 | Nagasawa et al. ................. 33/568 |
| 4,925,139 | 5/1990 | McCord ........................... 248/179 |
| 5,005,298 | 4/1991 | Nagasawa et al. ................. 33/573 |
| 5,051,594 | 9/1991 | Tsuda et al. ................... 250/442.1 |
| 5,051,646 | 9/1991 | Elings et al. ..................... 310/317 |

FOREIGN PATENT DOCUMENTS

| | | |
|---|---|---|
| 368579 | 5/1990 | European Pat. Off. . |
| 0034683 | 3/1979 | Japan . |
| 0273841 | 4/1986 | Japan . |
| 62-174811 | 1/1988 | Japan . |
| 470012 | 5/1975 | U.S.S.R. ................... 250/442.11 |
| WO-/A88/05524 | 7/1988 | WIPO . |

OTHER PUBLICATIONS

IBM Technical Disclosure Bulletin, vol. 15, No. 12, May 1973.
IBM Technical Disclosure Bulletin, vol. 27, No. 7B, Dec. 1984.

Primary Examiner—Jack I. Berman
Attorney, Agent, or Firm—Romualdas Strimaitis

[57] ABSTRACT

A dual quad flexure carriage and assembly, for receiving a sensing probe, is used for scanning the sensing probe across a target surface. The flexure carriage is a unitary structure providing flat motion for the sensing probe during the scanning procedure, while further compensating for thermal creep. The dual quad flexure assembly comprises the dual quad flexure carriage along with piezo actuators and control systems to provide highly linear orthogonal motion.

5 Claims, 4 Drawing Sheets

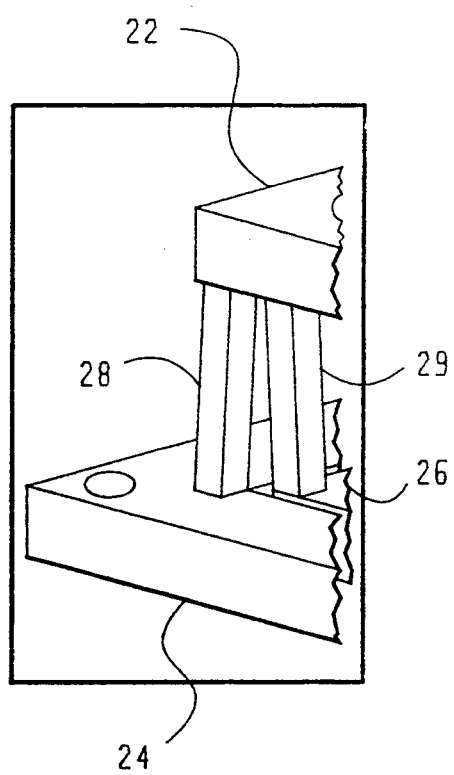 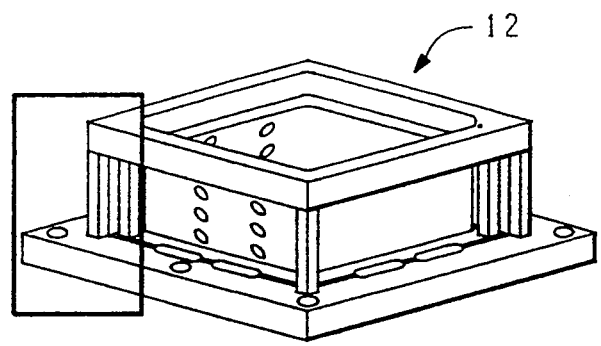
FIG. 3  FIG. 3A

DUAL QUAD FLEXURE SCANNER

FIELD OF THE INVENTION

The present invention relates to scanning devices delivering extremely stable, nanometer precise, two dimensional displacement of a scanning probe carriage across a target surface. The invention provides an apparatus for delivering the precise displacement for maintaining the constant tip to target surface gap while further providing flatness and thermal and drift compensation.

BACKGROUND OF THE INVENTION

Scanning probe microscopes (SPMs) are instruments that provide high resolution information about surface contours. Vertical movement of a sensing probe, in response to a raster scanning procedure of the sensing probe across a target surface, is used for determining the target surface contour. Implementations of SPM devices include implementations based on the interaction of attractive forces including atomic, electrical potential, magnetic, capacitive, or chemical potential to maintain a constant probe to target surface gap, or distance. One common use of these devices is imaging. Some types of SPMs have the capability of imaging individual atoms.

In addition to imaging surface contours, SPMs can be used to measure a variety of physical or chemical properties with detail over the range from a few Angstroms to hundreds of microns. For these applications, SPMs can provide lateral and vertical resolution that is not obtainable from any other type of device. Examples of applications include imaging or measuring the contour properties of transistors, silicon chips, disk surface, crystals, cells, or the like.

In order to provide for high resolution information about surface contours, variables for the SPM include the effective size of the scanning probe, the positioning of the scanning probe above the target surface, and the precision of the scanning device itself.

The positioning of the scanning probe above the target surface is to be at a distance of one or two atoms, or an order of magnitude of tens of Angstroms. Further, a non-contact method of positioning is desirable and is the subject of the copending application Ser. No. 07/897,646.

Traditionally, scanning probe microscopes have a carriage which can be displaced in x and y directions by means of a piezoelectric actuator, with facilities for fine adjustment. While the arrangement theoretically permits minute displacements of the carriage, it is more difficult to operate the smaller the desired displacement is. This is due to a certain unavoidable backlash in the mechanism and because of the natural friction of the resting stage, which is only overcome with a sudden and mostly exaggerated movement. In addition, some piezoelectric elements have some undesirable properties such as hysteresis, creep, and nonlinear motion.

Further, during the scanning procedure, it is desirable to move the carriage independently in a single plane. More specifically, in measuring surface microtopography, in order to survey a surface area accurately, the carriage used to move the scanning tip across the target surface must offer flat motion (i.e. move in a single plane). Flatness is key to large area angstrom level vertical measurements, inasmuch as any vertical deviation of the carriage cannot be separated from either the measurement of the surface contour and therefore contributing to the vertical measurement, or from a component contributing to a noise level. In the first instance, an "out-of flat" carriage motion is one that leads to an anomaly in the apparent surface contour thereby degrading the accuracy of the scanning procedure and integrity of the scan result. In the second instance, the "out-of flat" carriage motion offers a significant component to the noise level of the resulting scan.

Flexure devices or hinges permit motion or displacement in a member made of normally non-flexible material. Cut-outs or recesses within a flexure assembly may be separated by web-like sections that are sufficiently thin to provide a desired flexure capability. Such an embodiment is shown, for example, in U.S. Pat. No. 4,559,717. However, the embodiment is one that offers an in plane flexure that offers motion in one direction only, thereby making the device not suitable for scanning.

Further, thermal creep becomes critical when making measurements at the tip to target surface gaps of attractive force measurements. Thermal creep refers to the relative motion of the sample in relation to the probe tip caused by a change in temperature. It is a time dependent function that need not be linear or monotonic, and therefore cannot be fully corrected by use of post-processing schemes. Thermal creep is a function of many parameters, including: thermal expansion coefficients, magnitude and application of thermal gradient, shape of materials, and thermal mass of materials. Any one, or a combination, of the above parameters can effect the integrity of the scanning procedure as the tip to target surface gap varies due to thermal creep, thereby degrading the accuracy of the resulting scan.

In view of the fact that the resolution of the new microscope developments and the requirements in electronic circuit manufacturing have increased over several orders of magnitude, it has become necessary to design new positioning devices which avoid the disadvantages of the prior art.

OBJECTS OF THE INVENTION

It is therefore an object of the present invention to provide a scanning probe microscope scanner providing extremely flat, and highly linear orthogonal motion.

It is another object of the present invention to provide a scanning probe microscope scanner having a scanning probe carriage assembly providing natural thermal stability.

A further object of the invention is to provide a two axis instrument carriage which permits selective, controlled displacement along either axis independently while providing thermal and flatness compensation along a third axis.

It is another object of the present invention to provide a scanning probe carriage assembly providing three-dimensional controlled flexure movement.

SUMMARY OF THE INVENTION

The present invention provides an apparatus for scanning a sensing probe above a target surface. The sensing probe comprises a microminiature tip integrally formed or mounted at one end which is positioned and maintained above a target surface at a desired gap.

In one embodiment of the present invention, a scanning probe carriage consists of a unitary dual quad flexure carriage which comprises a base, and intermediate carriage, and an inner carriage. A set of first flexures are interposed between the base and the intermediate carriage so that the intermediate carriage is supported by the first quad flexures, and above the base. A set of second quad flexures are interposed between the intermediate carriage and the inner carriage so that the inner carriage is supported by the second quad flexures and suspended below the intermediate carriage. The scanning probe carriage further provides a surface upon which a scanning probe is received.

Further, an embodiment of the invention includes the scanning probe carriage disposed on frame and positioned between a piezo actuators and spring assemblies in a compressed state. Each piezo actuator is interposed between one side of the scanning probe carriage and a support block. In addition, each spring assembly is disposed on a side of the scanning probe carriage opposite that of a piezo actuator at its first end, and further providing a support means to the frame at its second end.

Linearity, thermal drift compensation, and flatness are critical in microscopy, since each improves the accuracy of measurements to be made while maintaining the scanning tip above the target surface.

BRIEF DESCRIPTION OF DRAWINGS

FIGS. 3-3A illustrate a partial view of the dual quad flexure carriage with an applied lateral force.

DETAILED DESCRIPTION OF THE INVENTION

Figure 1:
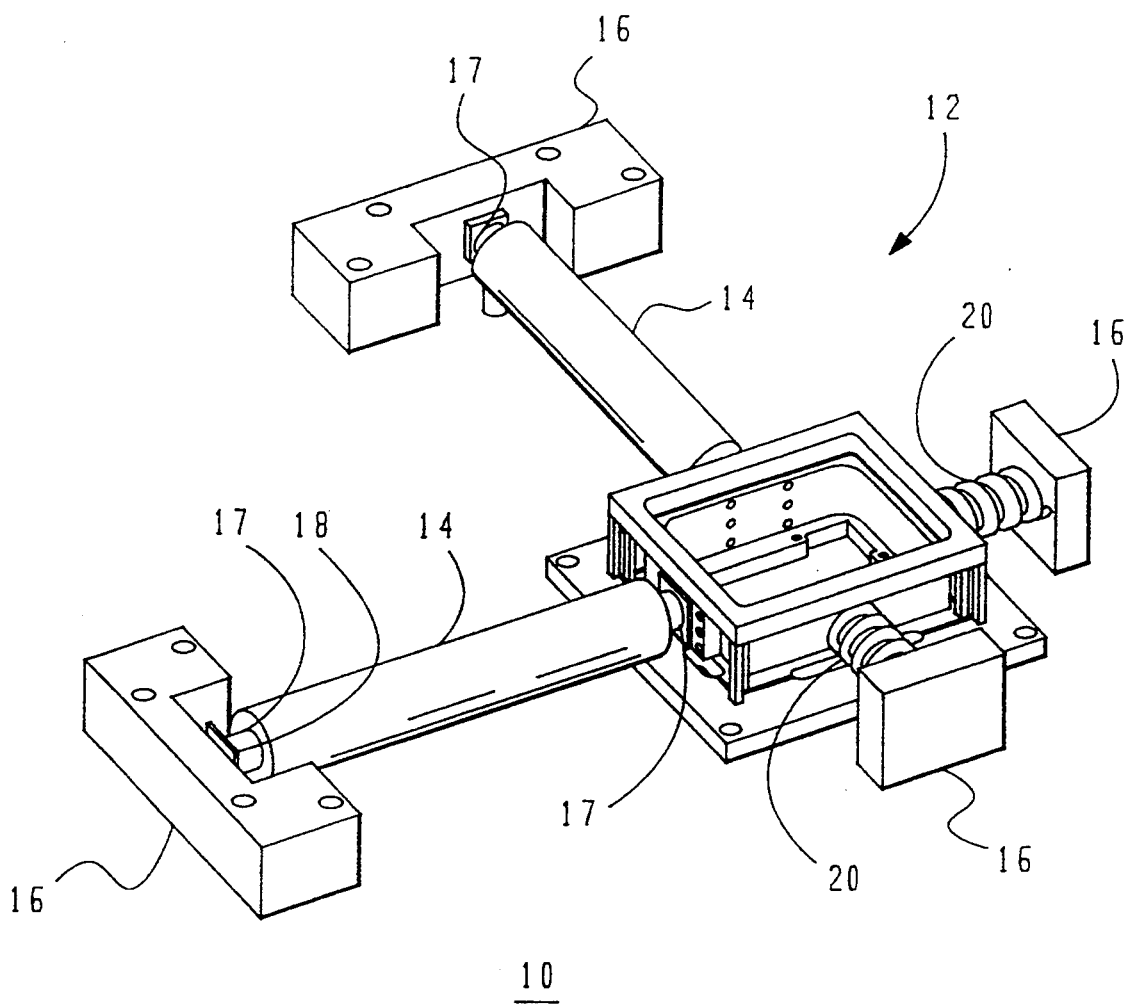
FIG. 1 illustrates the dual quad flexure assembly.

The assembly of FIG. 1 is used in a scanning probe microscope. It includes a frame 10 which provides a reference surface with respect to which a dual quad flexure carriage 12 is mounted. The dual quad flexure carriage 12 provides a surface upon which a scanning probe tip (not shown) is received and offers movement of the scanning probe tip with respect to the frame 10 in either an X or Y direction.

A pair of piezo actuators 14 (available as the DPTC actuator and manufactured by Queensgate Instruments Inc.) are attached to adjacent sides of the dual quad flexure carriage 12 such that the one end of the piezo actuator 14 bears against a side of the dual quad flexure carriage 12. The second end of each piezo actuator 14 is attached to a holder block 16, which in turn is fastened to the frame 10. The actuators are commercial units combining precision piezo stack actuators with capacitive position feedback sensors to produce motion linearities to +/−0.15% of full range. In the preferred embodiment, a one dimensional (1D) flexure 17 is interposed between a first end of the piezo actuator 14 and the respective side of the dual quad flexure carriage 12, and between a second end of the piezo actuator 14 and the respective holder block 16. The nature and mechanics of one dimensional flexures are known, as illustrated for example, in U.S. Pat. No. 4,667,415. The preferred embodiment further provides for a bearing 18 that is interposed between the second end of the piezo actuator 14 and the 1D flexure 17. In this embodiment, the 1D flexure elements allow a very small rotation about the flexure line without friction.

A pair of spring assemblies 20 are attached to adjacent sides, and opposite piezo actuators 14, of the dual quad flexure carriage 12 such that a first end of each spring assembly 20 bears against a side of the dual quad flexure carriage 12 and a second end is fastened to the frame 10 by a block 16 or similar support means. Each spring assembly 20 thus urging the dual quad flexure carriage 12 against the piezo actuator and maintaining the entire assembly in a compressed state. The preferred embodiment of compression of the invention is one in which the piezo actuator 14, carriage 12 and spring assembly 20 combination with support means are maintained substantially at 20 lbs. pressure.

Figure 2:
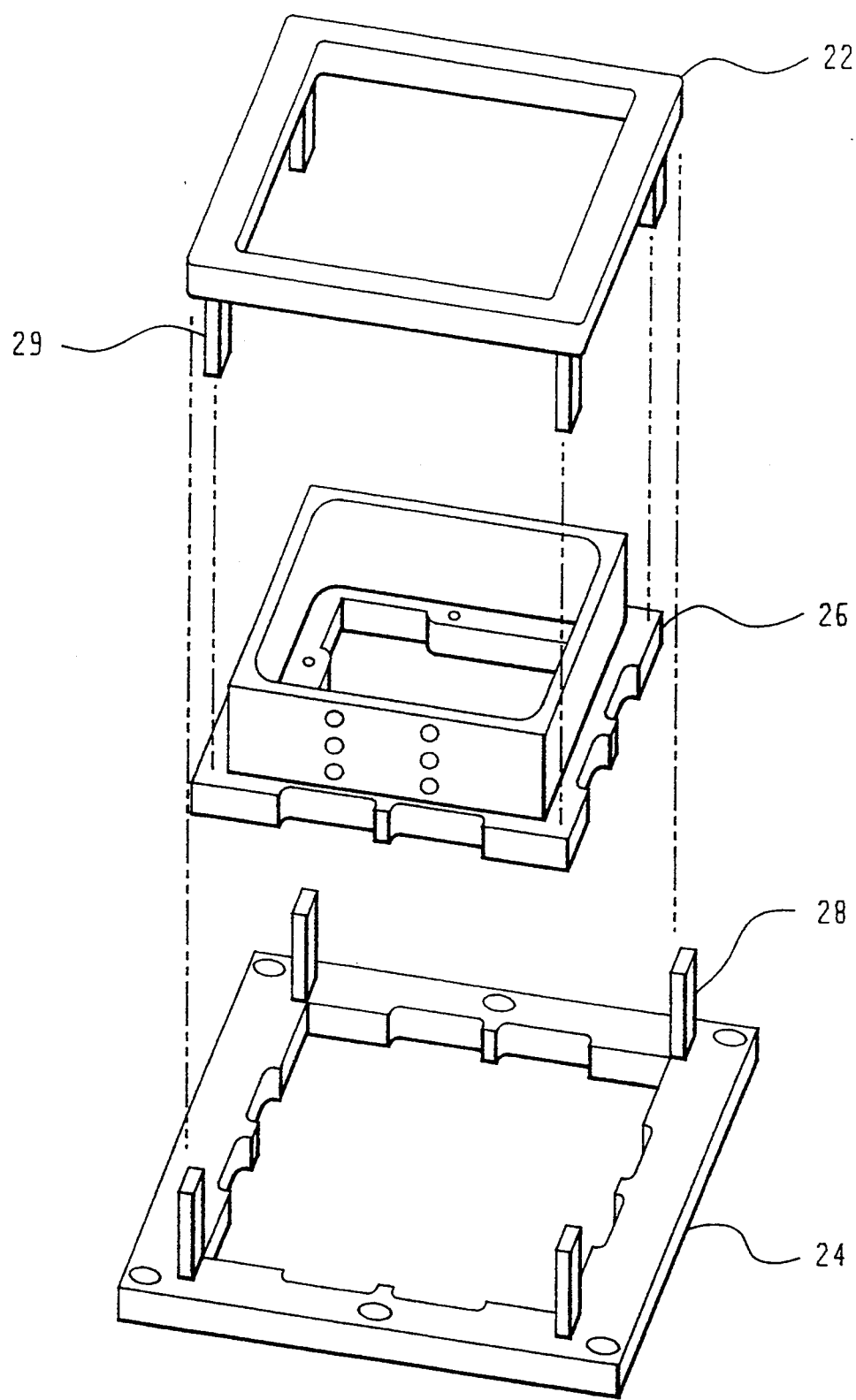
FIG. 2 illustrates an exploded perspective view of the dual quad flexure carriage.

Referring now to FIG. 2, it can be seen that the dual quad flexure carriage 12 consists of a unitary flexure assembly which comprises a base 24, an intermediate carriage 22, and an inner carriage 26. The dual quad flexure carriage 12 further comprises four outer flexures 28 and four inner flexures 29.

The intermediate carriage 22 is supported off of the base 24 by the four outer flexures 28. The intermediate carriage 22 and base 24 are each quadrilaterals that, along with the four outer flexures 28, form a first parallelogram. Similarly, the inner carriage 26 is suspended from the intermediate carriage 22 by the four inner flexures 29. The inner carriage 26 and intermediate carriage 22 likewise are quadrilaterals that, along with the four inner flexures 29, form a second parallelogram. As further illustrated in FIG. 2, the second parallelogram is smaller than the first parallelogram and is disposed within the first parallelogram such that the intermediate carriage 22 offers a common plane to each parallelogram. In turn, the inner carriage 26 provides a surface for receiving a scanning probe assembly (not shown).

The unitary construction of the dual quad flexure carriage 12 provides inherent geometric integrity of matched flexure pairs. The unitary construction of the dual quad flexure carriage 12 along with the matched flexure pairs further offer extremely flat horizontal motion and natural thermal stability. That is, if otherwise constructed with discrete components, the dual quad flexure carriage 12 could result in a structure with unmatched flexure pairs, and a structure lacking the benefits the flatness and thermal stability.

The feature of the dual quad flexure carriage 12 providing the property of flat motion is illustrated in FIG. 3. Each inner flexure 29 is double cantilevered between the inner carriage 26 and the intermediate carriage 22. Further, each outer flexure 28 is double cantilevered between the base 24 and the intermediate carriage 22. FIG. 3 illustrates a partial view of the dual quad flexure carriage 12 in a typical deflected condition. As shown in FIG. 3, a lateral force tends to urge the inner carriage 26 in the direction of the force and upward, toward the intermediate carriage 22. Likewise the same lateral force, tends to urge the intermediate carriage 22 downward toward the base 24. Provided the dimensions of both flexures 28, 29 and all cantilever and end conditions are the same, a lateral force applied to the dual quad flexure carriage 12 deflects each flexure 28, 29 the same amount. The upward motion of the inner carriage 26 toward the intermediate carriage 22 is then exactly canceled by the downward motion of the intermediate carriage 22 toward the base 24, thereby resulting in a flat horizontal motion of the inner carriage 26, as well as the entire dual quad flexure carriage 12, Further, the horizontal motion of the inner carriage 26, as well as the deflection of the flexures 28, 29 is dependent on the direction of the force applied. That is, the resulting displacement of the inner carriage 26 is limited to the direction of the force on the dual quad flexure carriage 12. Still however, one significant attribute of the system is that the dual quad flexure carriage 12 moves along one planar axis with minimum displacement along a second planar axis. The dual quad flexure carriage 12 rotates about the fixed 1D flexures 17 of each piezo actuator 14. Because of the large dimension of the piezo actuators 14 versus the scanning motion, displacement off a linear axis is small: less than 5 nm for the full 75 micron range, and less than 1 Angstrom for a useful 10 micron scan.

Thermal stability is also a property of the matched flexure 28, 29 pairs. Assuming both flexures 28, 29 in one corner of the dual quad flexure carriage 12 are subjected to the same ambient temperature, each will grow at the same rate (up and down) thereby canceling any net vertical motion of the inner carriage 26. Because of this differential property of the beam pair configuration, each of the four flexure pairs may be subjected to different ambient temperatures (within a few degrees) without theoretically affecting the inner carriage vertical position. This provides a measure of immunity to thermal gradients. To further minimize thermal effects, in the preferred embodiment, the dual quad flexure carriage 12 is made from annealed super invar which has a thermal coefficient of expansion better than two orders of magnitude below that of steel. To further minimize thermal effects, the matched flexures 28, 29 are set in close proximity to one another. This increases the likelihood of both flexures 28, 29 maintaining a same temperature. For thermal stability it is sufficient that each matched flexure 28, 29 pair be maintained at equal temperature; different pairs may be at different temperatures.

Although the preferred embodiment of the invention is one in which the dual quad flexure carriage 12 comprises two nested parallelograms, alternate embodiments may include any means whereby two geometrically similar structures are nested with a common reciprocating surface. The two similar structures further being displaced, one from the other, by a flexure means; the combination providing a single, unitary structure. In so doing, the arrangement provides for flat motion as well as natural thermal stability as described in the preferred embodiment of the present invention.

Figure 4:
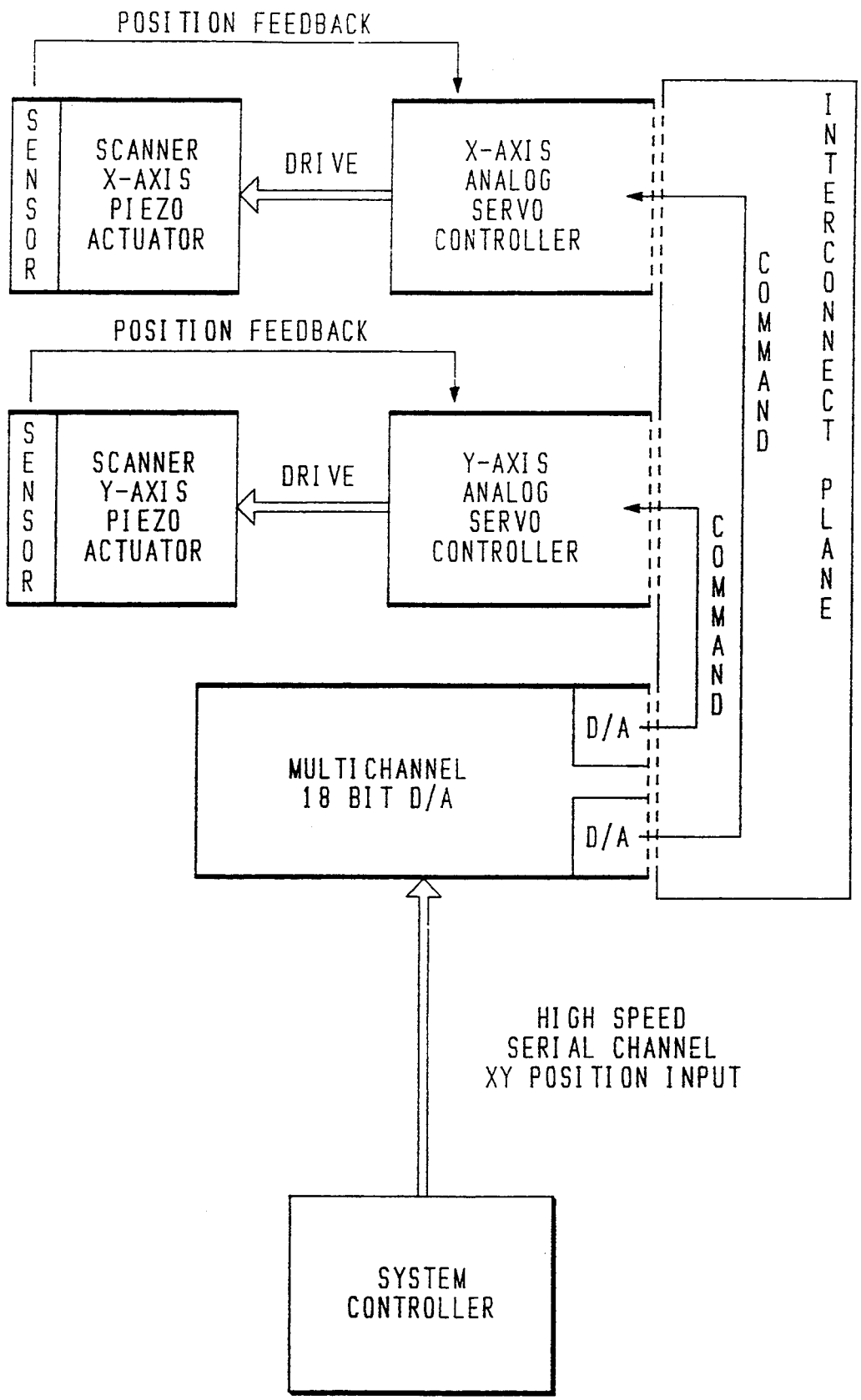
FIG. 4 illustrates the control/driver architecture for the dual quad flexure assembly.

The scanner subsystem electronics are shown in FIG. 4. Each piezo actuator 14 is driven by a servo controller to commanded positions. This controller implements a predominantly integral control law and, combined with high precision feedback sensors, provide piezo actuator 14 linearity.

In the preferred embodiment, analog command signals are delivered to the servo controllers over an interconnect plane from a multichannel digital to analog conversion board. This high resolution converter/driver receives the position command information in digital form over a high speed serial channel from the system controller. The system controller originates XY position coordinates as part of its task of overall motion coordination and data collection.

High resolution, 18 bit conversions are necessary to achieve small command voltage differences that result in the high resolution motion required of the scanner. Noise on the analog side directly contributes to the overall noise floor that becomes the lower limit of the motion resolution. This design is implemented to minimize that noise. All analog components are packaged in close proximity, and signals are distributed over backplanes instead of cables. The analog package is uniformly shielded, and all analog cable runs have been eliminated.

While the invention has been described above in connection with a preferred embodiment therefore as illustrated by the drawings, those of skill in the art will readily recognize alternative embodiments of the invention can be easily produced which do not depart from the spirit and scope of the invention as defined in the following claims.

We claim:

1. A flexure carriage comprising:
   a base;
   an intermediate carriage;
   an inner carriage;
   a plurality of first flexures, each having a lower and upper end, the lower end of each said first flexure integrally formed on the top of said base and extending vertically above said base, the upper end of each said first flexure integrally formed on the bottom of said intermediate carriage, and
   a plurality of second flexures, each having a lower and upper end, the upper end of each said second flexure integrally formed on the bottom of said intermediate carriage and extending vertically below said intermediate carriage, the lower end of each said second flexure integrally formed on the top of said inner carriage.

2. A flexure assembly comprising:
   a flexure carriage comprising;
   a base;
   intermediate carriage;
   an inner carriage;
   a plurality of first flexures, each having a lower and upper end, the lower end of each said first flexure integrally formed on the top of said base and extending vertically above said base, the upper end of each said first flexure integrally formed on the bottom of said intermediate carriage, and
   a plurality of second flexures, each having a lower and upper end, the upper end of each said second flexure integrally formed on the bottom of said intermediate carriage and extending vertically below said intermediate carriage, the lower end of each said second flexure integrally formed on the top of said inner carriage:
   means for supporting said flexure carriage;
   a plurality of piezo actuators, each interposed between one of said support means and said flexure carriage;
   a plurality of spring members opposing each said piezo actuator, the first end of each spring member disposed on said flexure carriage, the second end of each spring member disposed on one of said support means, each said spring member urging said flexure carriage toward said piezo actuator opposing each respective opposing spring member.

3. The flexure assembly as in claim 2, further comprising:
   a plurality of two dimensional flexures, interposed between each of said piezo actuators and said flexure carriage, and between each of said piezo actuators and said support means.

4. The flexure assembly as in claim 3, further comprising:

a plurality of bearings, each interposed between each of said piezo actuators and its respective said two dimensional flexure.

5. A dual quad flexure carriage comprising:

a base;

an intermediate carriage;

an inner carriage;

four first flexures, each having a lower and upper end, the lower end of each said first flexure integrally formed on the top of said base and extending vertically above said base, the upper end of each said first flexure integrally formed on the bottom of said intermediate carriage, and four second flexures, each having a lower and upper end, the upper end of each said second flexure integrally formed on the bottom of said intermediate carriage and extending vertically below said intermediate carriage, the lower end of each said second flexure integrally formed on the top of said inner carriage.

* * * * *